US012746715B2

(12) United States Patent
Hsu

(10) Patent No.: US 12,746,715 B2
(45) Date of Patent: Sep. 29, 2026

(54) VACUUM FORMING METHOD FOR MEMBRANE-LIKE OBJECTS HAVING PROTRUDING STRUCTURES AND FORMING APPARATUS THEREOF

(71) Applicant: Han-Chung Hsu, Taipei City (TW)

(72) Inventor: Han-Chung Hsu, Taipei City (TW)

( * ) Notice: Subject to any disclaimer, the term of this patent is extended or adjusted under 35 U.S.C. 154(b) by 89 days.

(21) Appl. No.: 18/714,590

(22) PCT Filed: Apr. 6, 2022

(86) PCT No.: PCT/CN2022/085340

§ 371 (c)(1),
(2) Date: May 30, 2024

(87) PCT Pub. No.: WO2023/193142

PCT Pub. Date: Oct. 12, 2023

(65) Prior Publication Data

US 2025/0042076 A1 Feb. 6, 2025

(51) Int. Cl.
*B29C 51/10* (2006.01)
*A61C 7/08* (2006.01)
(Continued)

(52) U.S. Cl.
CPC .............. *B29C 51/10* (2013.01); *B29C 51/20* (2013.01); *B29C 51/303* (2013.01); *B29C 51/36* (2013.01);
(Continued)

(58) Field of Classification Search
CPC ....... B29C 51/10; B29C 51/20; B29C 51/303; B29C 51/36; B29C 51/421; B29C 31/008;
(Continued)

(56) References Cited

U.S. PATENT DOCUMENTS 3,600,752 A * 8/1971 Kopp ...................... B29C 51/10
425/177
4,239,472 A 12/1980 Atkinson et al.
(Continued)

FOREIGN PATENT DOCUMENTS

CN 105034415 A 11/2015
CN 205890108 U * 1/2017
(Continued)

OTHER PUBLICATIONS

English translation of TW-M513012-U by EPO. (Year: 2015).*
English translation of CN-205890108-U by EPO. (Year: 2017).*

*Primary Examiner* — Inja Song
(74) *Attorney, Agent, or Firm* — LANWAY IPR SERVICES; Chun-Ming Shih

(57) ABSTRACT

A vacuum forming method for a membrane-like object having a protruding structure and its forming apparatus, the forming method includes the following steps: fixing a flat membrane having a protruding structure on a sealing device; fixing a product model on a vacuum pumping device; clamping a transfer device on the protruding structure; utilizing a heating device to heat the flat membrane for softening the flat membrane; controlling the transfer device to move the protruding structure to a predetermined forming position; fitting the sealing device tightly to the vacuum pumping device; pumping out air between the flat membrane and the product model by the vacuum pumping device to generate negative pressure, so that the flat membrane is completely attached to a surface of the product model to form a final membrane having the protruding structure; after cooling, the final membrane having the protruding structure is taken out of the cooling room.

5 Claims, 7 Drawing Sheets

(51) Int. Cl.

| | |
|---|---|
| ***B29C 51/20*** | (2006.01) |
| ***B29C 51/30*** | (2006.01) |
| ***B29C 51/36*** | (2006.01) |
| ***B29C 51/42*** | (2006.01) |
| ***B29L 31/00*** | (2006.01) |

(52) U.S. Cl.
CPC .............. *B29C 51/421* (2013.01); *A61C 7/08* (2013.01); *B29L 2031/753* (2013.01)

(58) Field of Classification Search
CPC ............ B29C 51/261; B29C 2791/006; B29C 51/262; B29C 51/264; B29C 51/46; B29C 35/0805; B29C 2035/0822; B29C 51/268; B29C 65/48; B29C 51/42; B29C 65/70; A61C 7/08; B29L 2031/753; B29L 2031/7536
See application file for complete search history.

(56) References Cited

U.S. PATENT DOCUMENTS

| | | | | |
|---|---|---|---|---|
| 5,667,386 | A * | 9/1997 | Black ................. | A61C 13/0024 433/213 |
| 2004/0152028 | A1 | 8/2004 | Singh et al. | |
| 2007/0190199 | A1 | 8/2007 | Arends | |
| 2008/0141534 | A1* | 6/2008 | Hilliard .................... | A61C 7/02 29/896.11 |
| 2016/0106572 | A1* | 4/2016 | Frantz ................... | B29C 64/112 264/16 |
| 2017/0144360 | A1* | 5/2017 | Moore, III ............... | A61C 7/08 |
| 2019/0047236 | A1* | 2/2019 | Ruiz ..................... | B29C 70/544 |
| 2020/0147856 | A1* | 5/2020 | Culp ....................... | B29C 51/24 |
| 2023/0158716 | A1* | 5/2023 | Nishimuta ............. | B33Y 10/00 264/16 |

FOREIGN PATENT DOCUMENTS

| | | | |
|---|---|---|---|
| CN | 209851569 | U | 12/2019 |
| CN | 111331819 | A | 6/2020 |
| JP | 2004306473 | A | 11/2004 |
| TW | 488374 | U | 5/2002 |
| TW | 200936104 | A | 9/2009 |
| TW | M513012 | U * | 12/2015 |
| WO | 91/06411 | | 5/1991 |
| WO | 2004049967 | A1 | 6/2004 |
| WO | 2014082624 | A2 | 6/2014 |

* cited by examiner

VACUUM FORMING METHOD FOR MEMBRANE-LIKE OBJECTS HAVING PROTRUDING STRUCTURES AND FORMING APPARATUS THEREOF

BACKGROUND OF THE INVENTION

1. Field of the Invention

The invention relates to a vacuum forming method for a membrane-like object having a protruding structure and its forming apparatus, to rapidly form a thin shell-like plastic structure and a forming apparatus, in particular, the thin shell-like plastic structure includes special convex structural constructions.

2. Description of Related Art

The processing and manufacturing of plastics or other plastic molecular structures have become quite mature with the development of science and technology, an existing type of plastic molecular structure is made by vacuuming a film in a malleable state to quickly adhere to the surface of a mold, and further produces a thin shell-like plastic structure with the contour of the surface of its mold.

This forming method is suitable for manufacturing irregular contours or specific customized products, such as invisible tooth braces, the teeth of each patient have a specific irregular contour, and thus after making a dental mold corresponding to the size of the patient, it can be formed using the existing techniques described above.

However, such forming technology is currently uncontrollable, as the rapid attachment of the membrane-like object to the surface of the mold is neither regular nor conducive to calculation. Therefore, if a special structure is to be designed on a specific position of the thin shell-like plastic structure, for example, if a clasping structure is designed on the side of the invisible braces, it will be difficult to ensure the molding position of the clasping structure, which may easily lead to defective products, and if an adhesive method is used to fix the special structure to the thin shell-like plastic structure, there will be a problem of poor stability.

SUMMARY OF THE INVENTION

To address the above problems, before forming the membrane-like object, the present invention adopts a computer simulation for constructing the special structure and forms it into a predetermined position on the membrane-like object in advance, through a controllable transfer device, pre-displaces the special structure along the simulated path to the forming position during the softening of the membrane-like object, and then allows the membrane-like object to be formed in vacuum on the surface of the mold as the solution method of the present invention.

The vacuum forming method for a membrane-like object having a protruding structure of the present invention includes the following steps: forming one or more protruding structures on a flat membrane; fixing the flat membrane having the protruding structure on a sealing device; fixing a product model on a vacuum pumping device; clamping one or more transfer devices on each of the protruding structures respectively; utilizing a heating device to heat the flat membrane for softening the flat membrane; controlling the transfer device to move the protruding structure to a predetermined forming position calculated based on a position of the product model fixed on the vacuum pumping device; fitting the sealing device tightly to the vacuum pumping device, so that the flat membrane corresponds to a top of the product model; pumping out air between the flat membrane and the product model by the vacuum pumping device to generate negative pressure, so that the flat membrane is completely attached to a surface of the product model to form a final membrane having the protruding structure.

More specifically, the protruding structure is formed into the flat membrane either by adhesion or by one-piece molding during the manufacture of the flat membrane.

More specifically, the heating device heats a bottom of the flat membrane.

More specifically, the transfer device displaces the protruding structure through three-dimensional vector control.

More specifically, the final membrane is trimmed after it is cooled and taken out to become the final product.

The present invention also includes a forming apparatus to execute the above methods.

The forming apparatus for a membrane-like object having a protruding structure of the present invention at least includes a vacuum pumping device, a sealing device, a transfer device, a heating device and a control host, the vacuum pumping device has a positioning platform, a positioning element is on the positioning platform, the positioning element is utilized to fix a product model, and a sealing ring is further installed around the positioning platform; the sealing device further corresponds to the vacuum pumping device, a buckle ring is further tightly fitted to an inner edge of the sealing device to sandwich a flat membrane having one or more protruding structures between the buckle ring and the sealing device, a lifting device is fixed to and helds the sealing device, the lifting device is electrically connected to a control host, the control host is used to drive the lifting device to lift the sealing device above the vacuum pumping device, and when the sealing device descends, it tightly adheres to the sealing ring, so that a sealed space is created between the flat membrane and the positioning platform; the transfer device is located on one side of the sealing device for clamping and/or displacing the protruding structure on the flat membrane, the transfer device is connected to a driver for controlling the transfer device to move, and the driver is electrically connected to the control host; the heating device is located on one side of the sealing device for heating the flat membrane sandwiched between the buckle ring and the sealing device, a shifter is fixed on the heating device, the heating device and the shifter are electrically connected to the control host.

In a preferred embodiment, the product model has a base, and a bottom of the base is combined with the positioning element to position the product model on the positioning platform.

In a preferred embodiment, the positioning element uses concave and convex structures, clips or latches to combine the product model and the positioning platform.

In a preferred embodiment, the driver controls the transfer device to move in two dimensions or three dimensions.

In a preferred embodiment, the heating device uses infrared heating.

DETAILED DESCRIPTION OF THE INVENTION

Figure 1:
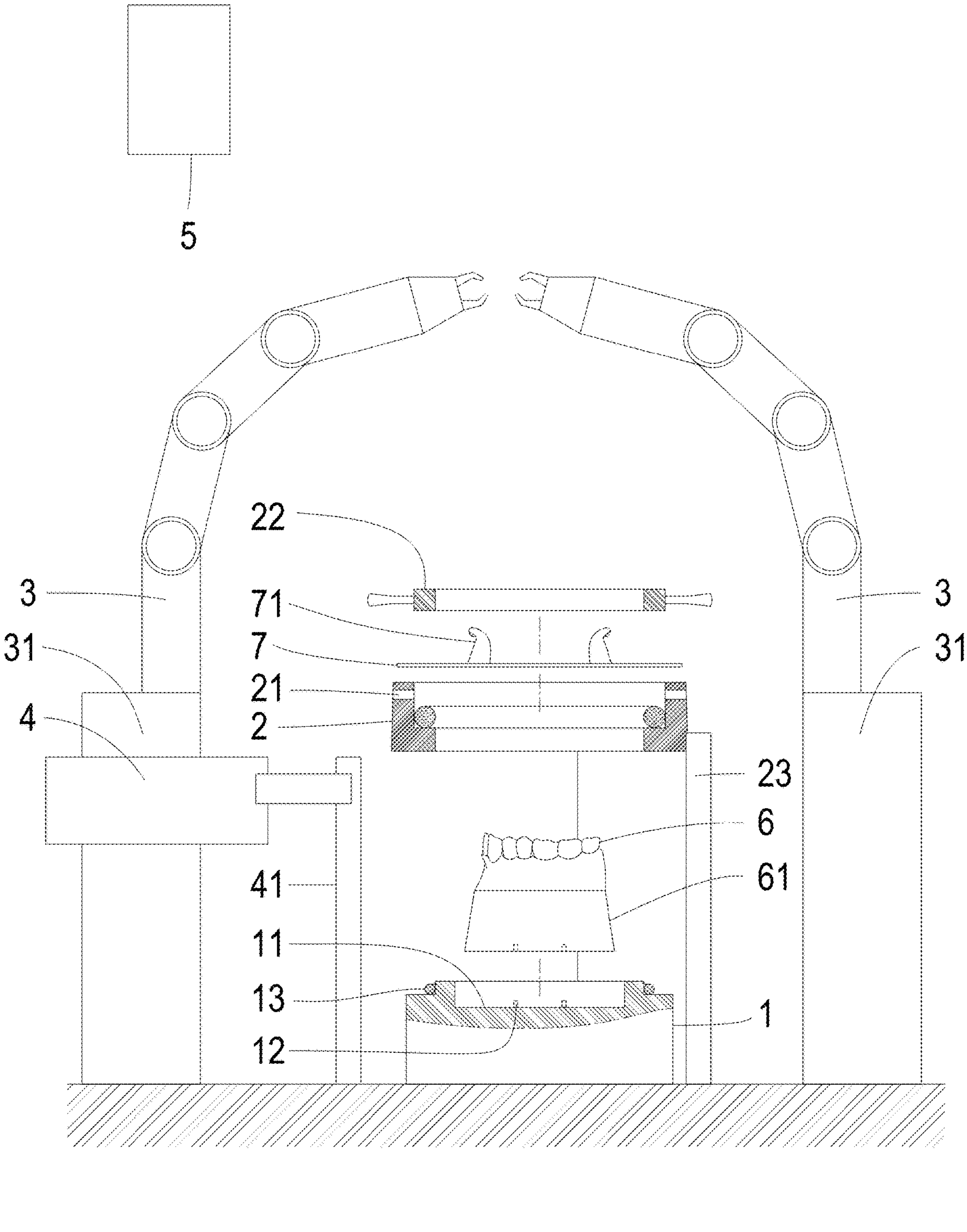
FIG. 1 is a schematic diagram of the overall structural configuration of a vacuum forming apparatus for a membrane-like object having a protruding structure according to the present invention.

The method of the present invention is illustrated by the following embodiments, but the present invention is not limited by the following embodiments.

As used herein, the term "one-piece molding" refers to the combination of one or more structures into a single body during manufacture, or to corresponding structures on the same body resulting from different positions, shapes, and functions.

The forming method for a membrane-like object having a protruding structure of the present invention is used for one-time vacuum forming of a membrane-like object having a protruding structure, the steps of the method are as follows:

- A, forming one or more protruding structures on a flat membrane, its forming method can be either by adhesion or by one-piece molding during the manufacture of the flat membrane;
- B, fixing the flat membrane having the protruding structure on a sealing device;
- C, fixing a product model on a vacuum pumping device;
- D, providing one or more transfer devices, the transfer devices are clamped on each of the protruding structures respectively;
- E, providing a heating device, moving the heating device to a bottom of the flat membrane, heating the bottom of the flat membrane for softening the flat membrane, moving the heating device aside after finishing the heating;
- F, operating the transfer devices to fold, pull or move the protruding structure to a predetermined forming position calculated based on a position of the product model fixed on the vacuum pumping device;
- G, displacing the transfer device and the sealing device synchronously to the top of the vacuum pumping device, so that the sealing device is tightly fitted to the vacuum pumping device, and the flat membrane can correspond to the top of the product model;
- H, the vacuum pumping device pumps out air between the flat membrane and the product model to generate negative pressure, so that the flat membrane can be completely attached to a surface of the product model and formed into a final membrane having the protruding structure; and
- I, the final membrane is trimmed after it is cooled and taken out of the cooling room to become the final product.

In addition to the above method, the present invention further includes a vacuum forming apparatus for a membrane-like object having a protruding structure. In the following detailed description of the preferred embodiment in association with the drawings attached to the specification, the technical contents, features, and effects of the forming apparatus thereof will be clearly presented.

As used herein, the articles "a," "an," and "any" refer grammatically to one or more than one (i.e., at least one) item. For example, "an element" means one element or more than one element.

As used herein, the terms "fixed", "secured", "installed", "articulated", or "set" to describe structural assembly relationships generally refer to multiple structures which, when assembled, will not readily separate or fall apart, could be a fixed connection, a detachable connection, an integrally molded connection, a mechanical connection, an electrical connection, or a direct physical connection, or it may be connected indirectly through an intermediate medium, e.g., by the use of any one of threads, latches, fasteners, nails, adhesives, or high-frequency wave bonding.

As used herein, the term "up" to describe the location of a structure refers to any surface location of the structure, not "above" or "on" which are commonly referred to as directional. The terms "above" and "below" used to describe the location of a structure refer to the directionality of the location of the structure in conventional use.

Please refer to FIG. 1, the production of tooth braces is taken as an example in the embodiment, as shown in the figure, it at least includes a vacuum pumping device 1, a sealing device 2, a transfer device 3, a heating device 4 and a control host 5, the vacuum pumping device 1 is utilized to fix and hold a product model 6 of tooth shape on it, and the sealing device 2 is utilized to fix a flat membrane 7 having a protruding structure 71.

Figure 2:
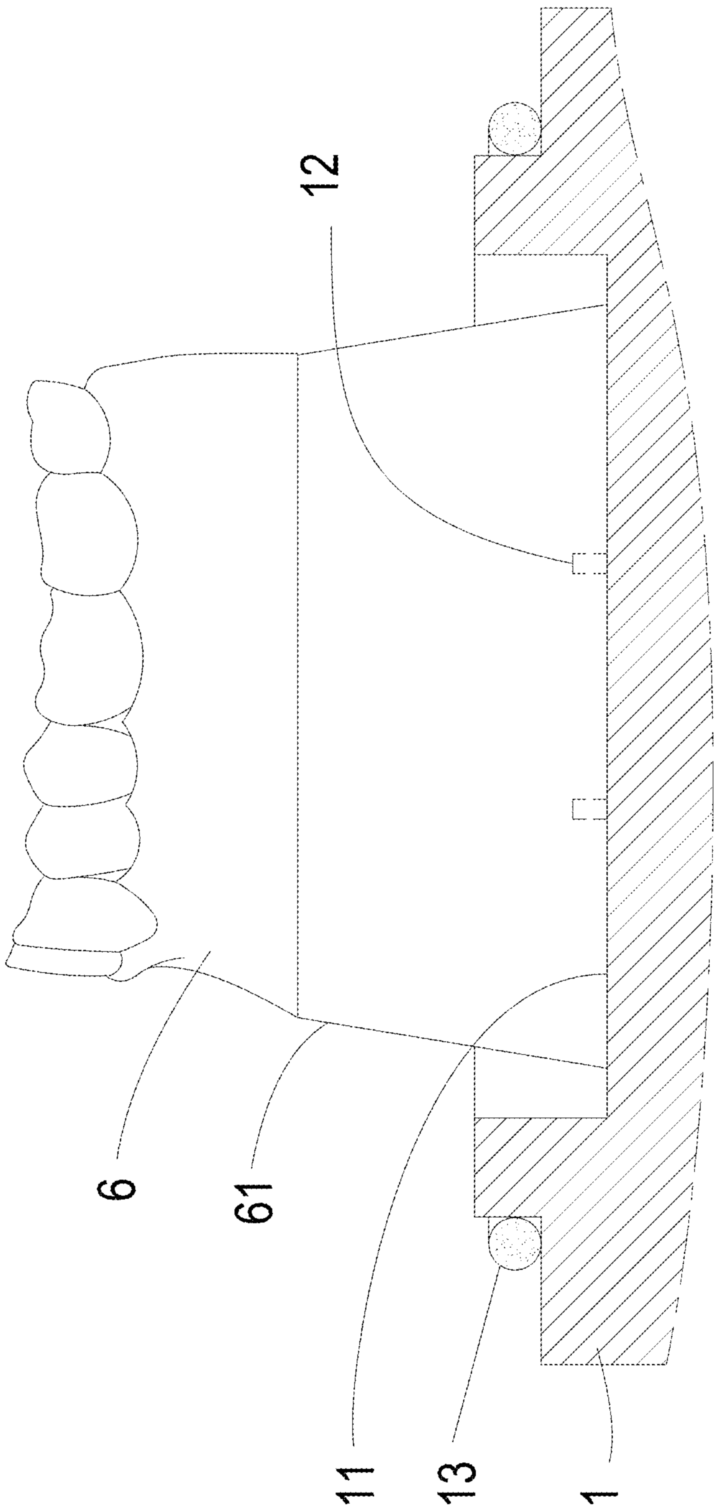
FIG. 2 is a partial cross-sectional view of the vacuum pumping device of the vacuum forming apparatus for a membrane-like object having a protruding structure according to the present invention.

Please refer to FIG. 1 to FIG. 2, a positioning platform 11 is provided on the vacuum pumping device 1, a positioning element 12 is provided on the positioning platform 11, the positioning element 12 is utilized to fix of the product model 6 of tooth shape, the product model 6 has a standard base 61, the bottom of the base 61 is combined with the positioning element 12 to position the product model 6 on the positioning platform 11, a sealing ring 13 is further installed around the positioning platform 11.

The positioning element 12 may be constructed using a corresponding combination structure such as concave and convex structures, clips, or latches, the combination structure is a common technical application, and thus the details will not be repeated.

The product model 6 of tooth shape is a customized mold of a human tooth and is molded and shaped onto the standard base 61, the structural technology is a general dentistry for the treatment of patient's teeth, and thus the details will not be repeated.

Figure 3:
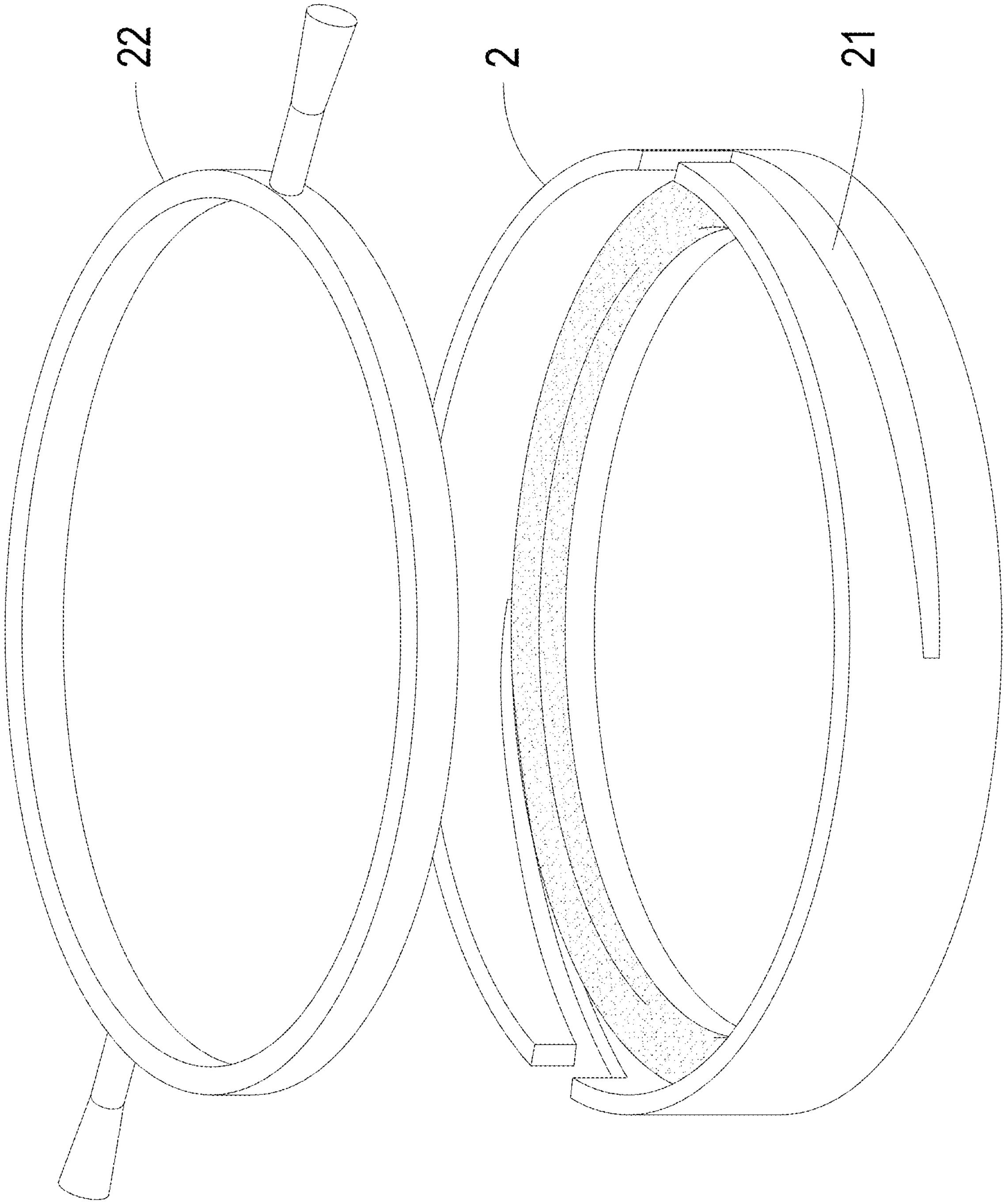
FIG. 3 is a schematic diagram of three-dimensional decomposition of a sealing device of the vacuum forming apparatus for a membrane-like object having a protruding structure according to the present invention.
Figure 4:
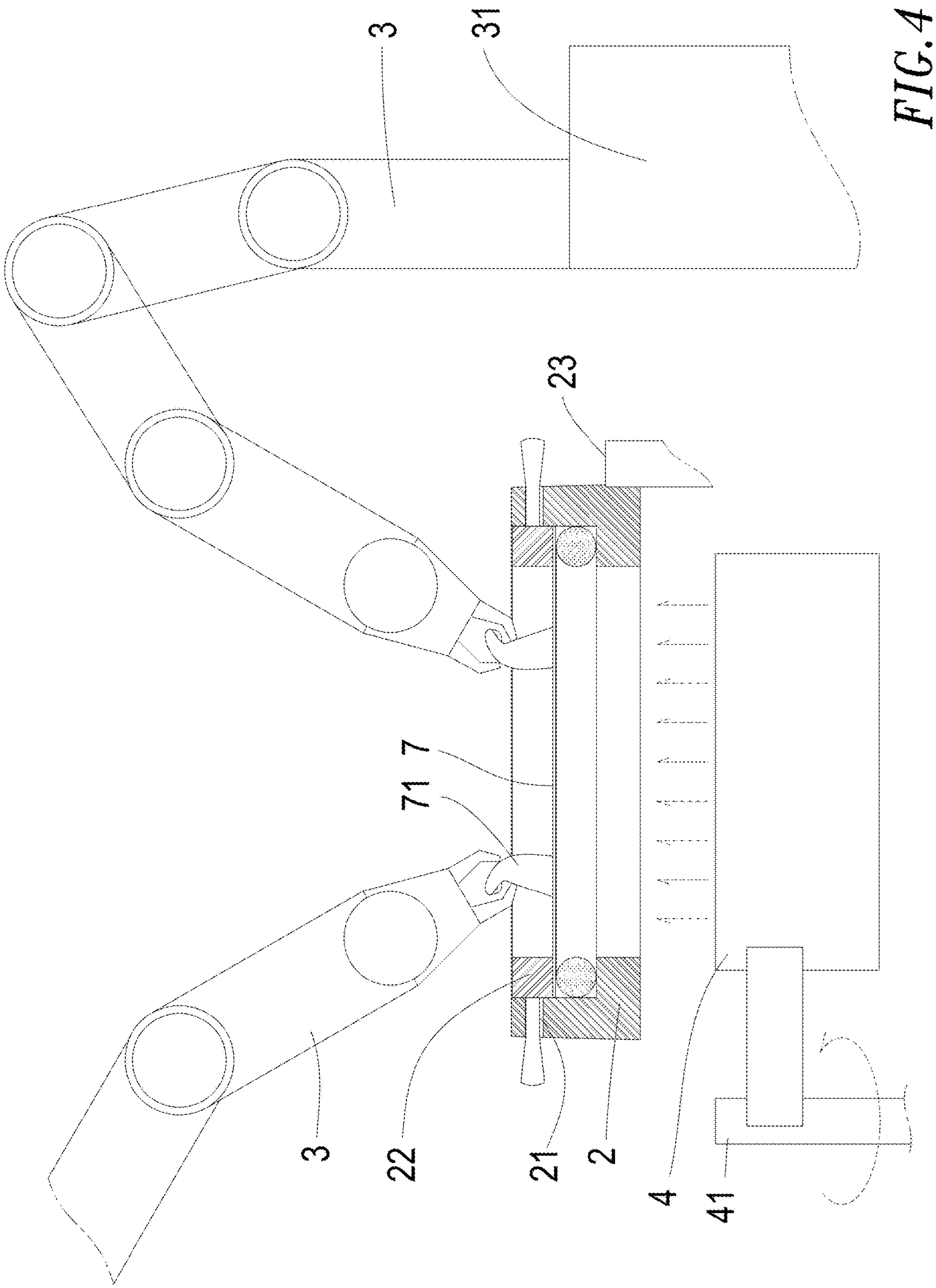
FIG. 4 is a schematic cross-sectional view of applying heat for the vacuum forming apparatus for a membrane-like object having a protruding structure according to the present invention.
Figure 5:
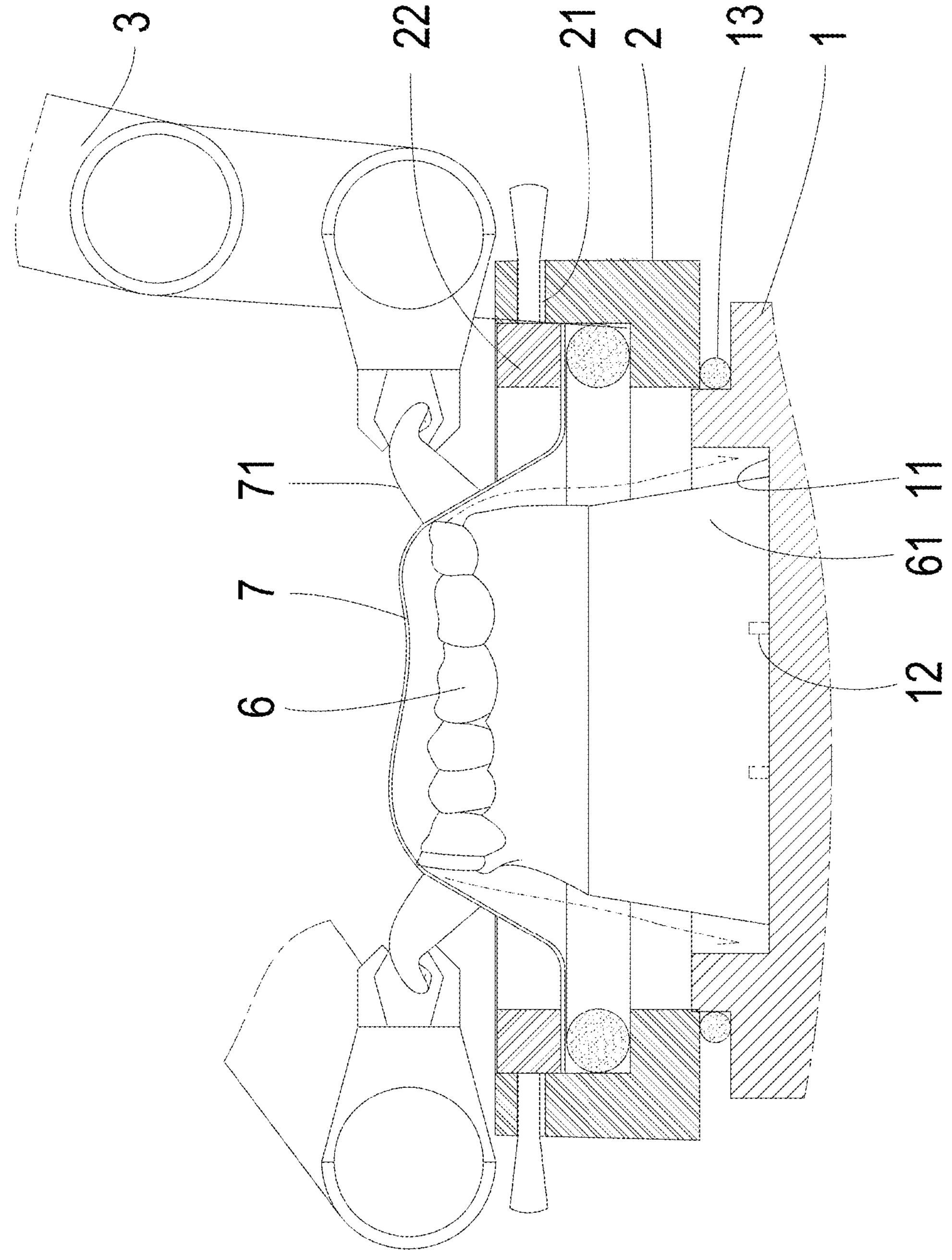
FIG. 5 is a schematic cross-sectional view of applying vacuum for the vacuum forming apparatus for a membrane-like object having a protruding structure according to the present invention.
Figure 6:
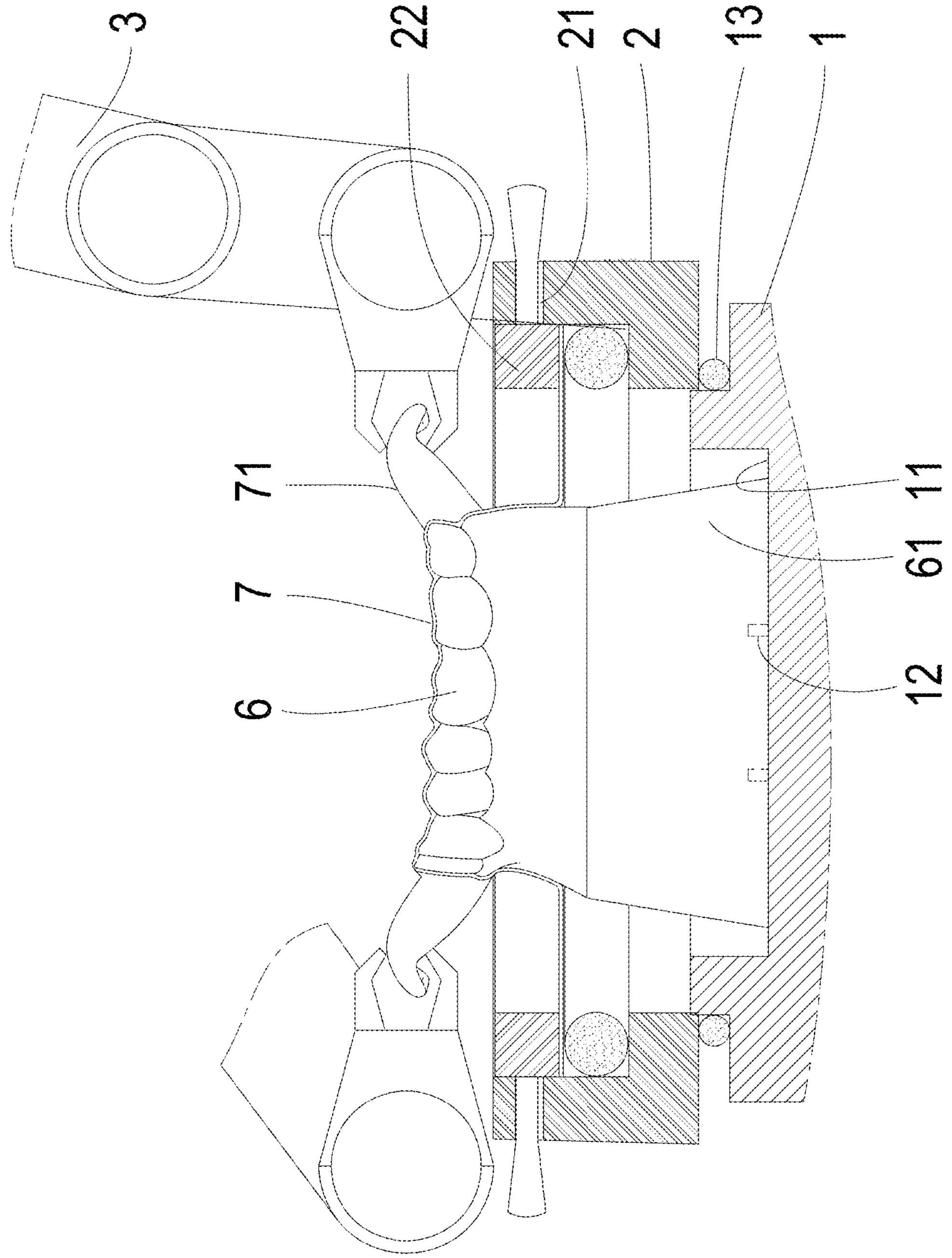
FIG. 6 is a schematic cross-sectional view of forming the diaphragm for the vacuum forming apparatus for a membrane-like object having a protruding structure according to the present invention.

Please refer to FIG. 1 and FIG. 3, the sealing device 2 is in the shape of a ring with a spiral buckle slot 21 around which a buckle ring 22 can be inserted, so that the buckle ring 22 is tightly fitted to an inner edge of the sealing device 2, a lifting device 23 is fixed to and helds the sealing device 2, and the lifting device 23 is electrically connected to the control host 5.

The flat membrane 7 is placed on the sealing device 2, when the buckle ring 22 is inserted into the buckle slot 21, the flat membrane 7 can be sandwiched between the buckle ring 22 and the sealing device 2.

The control host 5 is used to drive the lifting device 23 to lift the sealing device 2 above the vacuum pumping device 1. When the sealing device 2 descends, it tightly adheres to the sealing ring 13 to create a sealed space between the flat membrane 7 and the positioning platform 12, to facilitate the evacuation operation performed by the vacuum pumping device 1.

Please refer to FIG. 1, FIG. 3 to FIG. 6, the transfer device 3 is located on one side of the sealing device 2 and is utilized to clamp the protruding structure 71 on the flat membrane 7 and cooperate with the lifting device 23 to perform lifting actions synchronously, if there are two protruding structures 71, at least two transfer devices 3 will be provided to correspondingly clamp the protruding structures 71 respectively, these transfer devices 3 are all connected to a driver 31, these drivers 31 respectively control the transfer devices 3 to move in two dimensions or three dimensions, and the drivers 31 are all electrically connected to the control host 5, through the calculation and setting of the control host 5, the drivers 31 can be controlled to operate the transfer devices 3 to fold, pull or move these protruding structures 71 to a predetermined forming position.

The transfer device 3 can move in two dimensions or three dimensions, and a transfer device can be used, the transfer device can be a linear arm (orbital type), a SCARA arm, a joint multi-axis transfer device.

Figure 7:
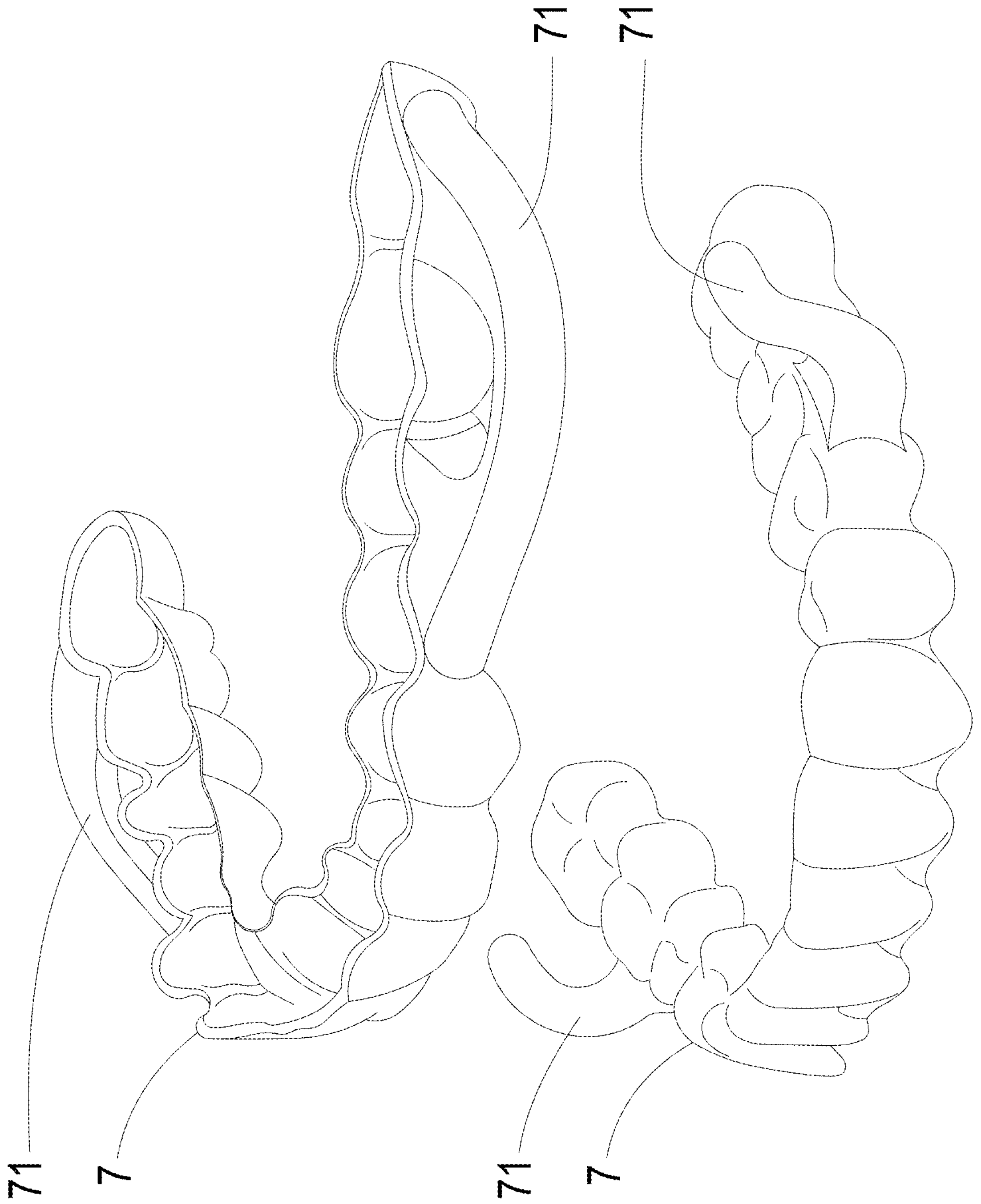
FIG. 7 is a schematic diagram of a flat membrane made by the vacuum forming apparatus for a membrane-like object having a protruding structure according to the present invention.

Please refer to FIG. 7, in the embodiment, these transfer devices 3 bend the two protruding structures 71 symmetrically downward and inward, so that when the flat membrane 7 is formed into the tooth brace of the product model 6, the two protruding structures 71 are symmetrically positioned on both sides as a structure to securely bond the tooth brace, since the transfer devices 3 still clamp the protruding structures 71 when the flat membrane 7 is formed, the protruding structures 71 can be prevented from changing positions, the position, angle or direction of these displacements can be calculated in advance by simulating and constructing the entire product forming path through a computer based on the positioning position of the standard base 61 on the positioning platform 11.

Please refer to FIG. 7, in this embodiment, the flat membrane 7 is utilized to manufacture tooth braces, and the protruding structure 71 grows behind both sides of the tooth braces as a clip structure (a tick block and a buckle ring) for fixation, however, when utilized to manufacture different types of products, the protruding structure 71 can be an external protruding structure of any shape or an unspecified shape, and its application will be different accordingly, because the protruding structure 71 can be molded in advance by other techniques, it can be made into a structure with a special contour shape, thus breaking through the technical limitations of vacuum molding in the past, and producing more tooth braces that are difficult to form.

Please refer to FIG. 1, FIG. 3 to FIG. 5, the heating device 4 is located on one side of the sealing device 2 and can use infrared heating, a shifter 41 is fixed on the heating device 4, the heating device 4 and the shifter 41 are electrically connected to the control host 5.

When the flat membrane 7 is sandwiched between the buckle ring 22 and the sealing device 2, the control host 5 drives the shifter 41 for driving the heating device 4 to the bottom of the sealing device 2, and turns on the heating device 4 to heat the flat membrane 7 to facilitate the subsequent softening and molding operation, since the protruding structure 71 is clamped by the transfer device 3, it can thus be explained that the transfer device 3 dissipates heat from the protruding structure 71, so that the protruding structure 71 will not be softened and deformed by heat, after heating is completed, the control host 5 drives the shifter 41 again to drive the heating device 4 to move out from the bottom of the sealing device 2.

The disclosure of the above embodiments is merely a selection of some of the preferred embodiments of the present invention, but is not intended to limit the scope of the present invention, any person skilled in the art, upon understanding the foregoing technical features and embodiments of the present invention, can make equal changes or modifications without departing from the scope of protection of the present invention (although the embodiment is based on the example of tooth braces, it is not only for making tooth braces, but also for other special shaped models such as toy car cases and cell phone cases, etc.), which still fall within the scope of protection of the present invention.

The invention claimed is:

1. A vacuum forming apparatus for a membrane-like object having a protruding structure, characterized in that, comprising:

- a vacuum pumping device, comprising a positioning platform, wherein a positioning element is disposed on the positioning platform, the positioning element is utilized to fix a product model, and a sealing ring is installed around the positioning platform;
- a sealing device, corresponding to the vacuum pumping device, wherein a buckle ring is tightly fitted to an inner edge of the sealing device to sandwich a flat membrane having one or more protruding structures between the buckle ring and the sealing device, a lifting device is fixed to and holds the sealing device, the lifting device is electrically connected to a control host, the control host is used to drive the lifting device to lift the sealing device above the vacuum pumping device, and when the sealing device descends, it tightly adheres to the sealing ring, so that a sealed space is created between the flat membrane and the positioning platform;
- a transfer device, located on one side of the sealing device for clamping and/or displacing the protruding structure on the flat membrane, wherein the transfer device is connected to a driver for controlling the transfer device to move, and the driver is electrically connected to the control host; and
- a heating device, located on one side of the sealing device for heating the flat membrane sandwiched between the buckle ring and the sealing device, wherein a shifter is fixed on the heating device, and the heating device and the shifter are electrically connected to the control host.

2. The vacuum forming apparatus for a membrane-like object having a protruding structure according to claim 1, wherein the product model has a base, and a bottom of the base is combined with the positioning element to position the product model on the positioning platform.

3. The vacuum forming apparatus for a membrane-like object having a protruding structure according to claim 1, wherein the positioning element uses concave and convex structures, clips or latches to combine the product model and the positioning platform.

4. The vacuum forming apparatus for a membrane-like object having a protruding structure according to claim 1, wherein the driver controls the transfer device to move in two dimensions or three dimensions.

5. The vacuum forming apparatus for a membrane-like object having a protruding structure according to claim 1, wherein the heating device uses infrared heating.

* * * * *